US011306691B2

(12) United States Patent
McClelland et al.

(10) Patent No.: US 11,306,691 B2
(45) Date of Patent: Apr. 19, 2022

(54) AIR BOX WITH INTEGRATED FILTER MEDIA

(71) Applicant: K&N Engineering, Inc., Riverside, CA (US)

(72) Inventors: Kevin McClelland, Rancho Cucamonga, CA (US); Steve E. Williams, Cherry Valley, CA (US); Colin Arthur Cranstone, Palm Springs, CA (US)

(73) Assignee: K&N Engineering, Inc., Riverside, CA (US)

( * ) Notice: Subject to any disclaimer, the term of this patent is extended or adjusted under 35 U.S.C. 154(b) by 197 days.

(21) Appl. No.: 16/443,625

(22) Filed: Jun. 17, 2019

(65) Prior Publication Data

US 2019/0301409 A1 Oct. 3, 2019

Related U.S. Application Data

(62) Division of application No. 14/181,678, filed on Feb. 16, 2014, now Pat. No. 10,359,010.

(51) Int. Cl.
*F02M 35/024* (2006.01)
*B01D 46/24* (2006.01)
(Continued)

(52) U.S. Cl.
CPC ... *F02M 35/02416* (2013.01); *B01D 46/0005* (2013.01); *B01D 46/0082* (2013.01); *B01D 46/2403* (2013.01); *F01P 11/06* (2013.01); *F02M 35/024* (2013.01); *F02M 35/02441* (2013.01); *F02M 35/02483* (2013.01); *F02M 35/08* (2013.01); *B01D 2265/06* (2013.01); *B01D 2279/60* (2013.01); *F01P 2011/065* (2013.01); *Y10T 29/49826* (2015.01)

(58) Field of Classification Search
CPC ....... F02M 35/02416; F02M 35/02441; F02M 35/02483; F02M 35/024; F02M 35/08; F01P 11/06; F01P 2011/065; B01D 46/2403; B01D 46/0005; B01D 46/0082; B01D 2265/00; B01D 2279/60
See application file for complete search history.

(56) References Cited

U.S. PATENT DOCUMENTS 4,157,902 A 6/1979 Tokar
4,365,980 A 12/1982 Culbert
(Continued)

*Primary Examiner* — Grant Moubry
(74) *Attorney, Agent, or Firm* — Rutan & Tucker LLP; Hani Z. Sayed

(57) ABSTRACT

An apparatus and a method are provided for an air box with an integrated air filter to communicate air flow from an exterior of the air filter to an air intake of an automobile engine. The air filter comprises a filter material that surrounds at least a portion of an interior cavity of the air filter. An end cap is affixed to a distal end of the filter material, and a wire support extends along at least a portion of the exterior surface of the filter material. The air box comprises a housing portion and a mount portion. The housing portion is configured to direct air drawn through the filter material into the interior cavity of the air filter and then into the air intake of the automobile engine. The mount portion is configured to support the air box and the air filter once installed within an automobile engine bay.

4 Claims, 4 Drawing Sheets

(51) Int. Cl.
  *B01D 46/00* (2006.01)
  *F01P 11/06* (2006.01)
  *F02M 35/08* (2006.01)

(56) References Cited

U.S. PATENT DOCUMENTS

| | | | |
|---|---|---|---|
| 5,112,369 A * | 5/1992 | Brownell | B01D 46/10 |
| | | | 427/244 |
| 5,302,153 A | 4/1994 | Winters | |
| RE37,163 E | 5/2001 | Oussoren | |
| 6,641,646 B2 * | 11/2003 | Rosenberg | B01D 41/04 |
| | | | 55/283 |
| 6,866,693 B2 * | 3/2005 | Igarashi | B01D 46/0057 |
| | | | 55/385.3 |
| 7,135,051 B2 | 11/2006 | Baldinger | |
| 7,179,315 B2 | 2/2007 | Huang | |
| D544,083 S | 6/2007 | Walser | |
| 7,247,181 B2 | 7/2007 | Hansen | |
| 7,347,883 B2 | 3/2008 | Bajza | |
| 7,691,162 B2 | 4/2010 | McCahill | |
| D642,593 S | 8/2011 | Finnie | |
| 8,220,437 B2 | 7/2012 | Yamada | |
| 2004/0003719 A1 | 1/2004 | Le | |
| 2005/0125939 A1 | 6/2005 | Hansen | |
| 2005/0125940 A1 | 6/2005 | McDowell | |
| 2005/0210843 A1 | 9/2005 | Bajza et al. | |
| 2005/0217625 A1 | 10/2005 | Niaken | |
| 2006/0288673 A1 | 12/2006 | Wimmer | |

\* cited by examiner

AIR BOX WITH INTEGRATED FILTER MEDIA

PRIORITY

This application is a divisional of, and claims the benefit of, U.S. patent application filed on Feb. 16, 2014, and having application Ser. No. 14/181,678, the entirety of said application being incorporated herein by reference.

FIELD

The field of the present invention generally relates to air filters. More particularly, the field of the invention relates to an apparatus and a method for an air box with an integrated air filter medium.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally the air intakes of internal combustion engines and compressors tend to use either: paper, foam, or cotton filters. Some filters use an oil bath. Air filters for internal combustion engines prevents abrasive particulate matter from entering the engine's cylinders, where it would cause mechanical wear and oil contamination. Many fuel injected engines utilize a flat panel pleated paper filter element. This filter is usually placed inside an enclosed, plastic box connected to a throttle body by way of ductwork. Vehicles that use carburetors or throttle body fuel injection systems typically use a cylindrical air filter positioned above the carburetor or the throttle body.

A drawback to enclosed air boxes that require flat panel paper filters is that as particular matter builds up in the filter, air flow through the filter becomes restricted. Such a restricted air flow generally leads to a reduction in engine performance, such as a decrease in engine power output and a greater fuel consumption. Moreover, as the paper filter becomes increasingly clogged, pressure inside the filter decreases while the atmospheric air pressure outside the filter remains the same. When the difference in pressure becomes too great, contaminants may be drawn through the paper filter directly into the engine. Thus, the ability of the paper filter to protect the engine from contamination and internal damage tends to decrease near the end of the filter's service life. Typically, paper air filters are removed from the vehicle and discarded, and a new paper air filter is then installed. Considering that there are millions of vehicles throughout the world, the volume of discarded air filters that could be eliminated from landfills is a staggering number. Another drawback to enclosed air boxes is that they typically draw air through a tortuous path of hoses or ductwork before the air enters the intake of the engine. In some cases, the air box is a greater source of air restriction than is the paper filter. Similar to a contaminated air filter, a restrictive air box decreases engine performance and fuel economy. Therefore, what is needed is an air box which exhibits reduced air resistance and an air filter which may be periodically cleaned and reused.

SUMMARY

An apparatus and a method are provided for an air box with an integrated air filter to communicate air flow from an exterior of the air filter to an intake portion of an automobile engine. The air filter comprises a filter material circumferentially extending such that the filter material surrounds at least a portion of an interior cavity of the air filter. An end cap is affixed to a distal end of the filter material, and a wire support extends along at least a portion of the exterior surface of the filter material. The distal end cap and the wire support are configured to support the air filter and retain the filter material in a desired configuration. The air box comprises a housing portion and a mount portion. A front surface of the housing portion includes a conduit configured to receive an air intake conduit extending from the intake portion of the automobile engine. A back surface of the housing portion includes a ridge and a recess configured to receive a proximal end of the filter material. The housing portion is configured to direct air drawn through the filter material into the interior cavity of the air filter and then through the conduit into the intake portion of the automobile engine. The mount portion is configured to support the air box and the air filter, once installed, within an interior of an automobile engine bay. In an embodiment, the air filter is fastened to the housing portion such that the air filter is irremovable from the air box. Rather than removing and replacing the air filter, as is common with conventional air filters, the air filter of the present invention is periodically cleaned and reused. In an embodiment, the air box with the integrated air filter may be cleaned while installed within the engine bay by removing the air intake conduit of the automobile engine from the conduit of the air box, inserting a water hose through the conduit into the interior cavity of the air filter, and spraying water so as to flush contaminants from the filter material. The water and contaminants drain from a bottom portion of the air filter and exit the engine bay.

In an exemplary embodiment, an apparatus for an air box with an integrated air filter comprises the air filter comprising a filter material circumferentially extending such that the filter material surrounds at least a portion of an interior cavity of the air filter, a distal end cap affixed to a distal end of the filter material, and a wire support extending along at least a portion of an exterior surface of the filter material; and a housing portion and a mount portion of the air box, where a front surface of the housing portion comprises a conduit with an opening and a transition that are configured to receive an air intake conduit extending from an intake portion of an automobile engine, and a back surface of the housing portion comprises a ridge and a recess configured to fixedly receive a proximal end of the filter material, such that air drawn through the filter material into the interior cavity is drawn through the opening of the conduit into the intake portion of the automobile engine; wherein the mount portion is configured to be installed within an interior of an automobile engine bay, and wherein the housing portion is configured to support the air filter and provide a communicative air flow from an exterior of the air filter to the intake portion of the automobile engine.

In an exemplary embodiment, the air filter is fastened to the housing portion such that the air filter is irremovable from the air box. In an exemplary embodiment, the air box is comprised of a material which is sufficiently durable and temperature resistant to retain its configuration during installation and operation. In an exemplary embodiment, the mount portion includes a suitable fastening means to facilitate installing the air box into the automobile engine bay. In an exemplary embodiment, the fastening means is dependent on the specific make and model of the automobile with which the air box is to be used.

In an exemplary embodiment, the transition provides a connection between the conduit and the housing portion. In an exemplary embodiment, the transition comprises a molded portion between the conduit and the housing portion. In an exemplary embodiment, the transition positions a longitudinal dimension of the conduit at an angle relative to the housing portion. In an exemplary embodiment, the angle between the conduit and the housing portion depends upon the particular automobile for which the air box is to be utilized.

In an exemplary embodiment, the opening has a diameter suitable to accept the air intake conduit of the automobile engine. In an exemplary embodiment, the flange has a configuration suitable to accept the air intake conduit of the automobile engine. In an exemplary embodiment, fasteners are used to affix the proximal end within the recess. In an exemplary embodiment, the ridge is crimped such that it folds onto and retains the wire support and the filter material of the air filter. In an exemplary embodiment, the air box and the air filter are configured such that the air filter may be periodically cleaned without removing the air filter from the air box.

In an exemplary embodiment, the mount portion further comprises a plurality of structural supports. In an exemplary embodiment, the structural supports are ribs configured to increase the rigidity of the mount portion. In an exemplary embodiment, the housing portion comprises a plurality of structural members. In an exemplary embodiment, the structural members are ribs configured to increase the rigidity of the housing portion.

In an exemplary embodiment, the distal end cap is comprised of a material which is sufficiently hard to retain the filter material in a desired configuration and support the air filter when coupled to the housing portion. In an exemplary embodiment, the distal end cap is crimped around its peripheral edge such that it folds onto and retains the wire support and the filter material.

In an exemplary embodiment, the filter material is positioned between the wire support and one or more layers of a reinforcing material. In an exemplary embodiment, the wire support comprises a first wire screen positioned on an outer surface and a second wire screen positioned on an inner surface of the filter material. In an exemplary embodiment, the filter material provides a surface area through which to pass an air stream and trap particulate matter and other contaminates so as to prevent them from entering into the air intake of the automobile engine. In an exemplary embodiment, the filter material is comprised of paper, foam, cotton, spun fiberglass, or other known filter materials, woven or non-woven material, synthetic or natural, or any combination thereof. In an exemplary embodiment, the filter material is pleated or otherwise shaped or contoured to increase the surface area for passing the air stream to be cleaned. In an exemplary embodiment, the filter material comprises oil to enhance the air cleaning properties of the filter material.

In an exemplary embodiment, a method for cleaning an air box with an integrated air filter which is installed within an engine bay of an automobile comprises removing an air intake conduit of an automobile engine from a conduit of the air box, where the conduit comprises a flange and an opening into an interior cavity of the air filter, and where the interior cavity is bounded by a circumferentially extending filter material and a distal end cap; inserting a water hose through the opening into the interior cavity of the air filter; and spraying water so as to flush contaminants from the filter material, such that the water and contaminants drain from a bottom of the air filter and exit the engine bay.

In an exemplary embodiment, a method for providing an air box with an integrated air filter to communicate air flow from an exterior of the air filter to an air intake portion of an automobile engine comprises extending a filter material circumferentially so as to form at least a portion of an interior cavity of the air filter; extending a wire support along at least a portion of the filter material; affixing a distal end cap to a distal end of the filter material, such that the wire support is retained along the at least a portion of the filter material and the air filter retains its shape during operation and cleaning; forming a housing portion and a mount portion of the air box, such that a front surface of the housing portion comprises a conduit with an opening and a transition to receive an air intake conduit extending from the air intake portion of the automobile engine, and such that a back surface of the housing portion comprises a ridge and a recess to fixedly receive a proximal end of the filter material; and configuring the mount portion to be installed within an interior of an automobile engine bay.

BRIEF DESCRIPTION OF THE DRAWINGS

The drawings refer to embodiments of the present invention in which.

Figure 1:
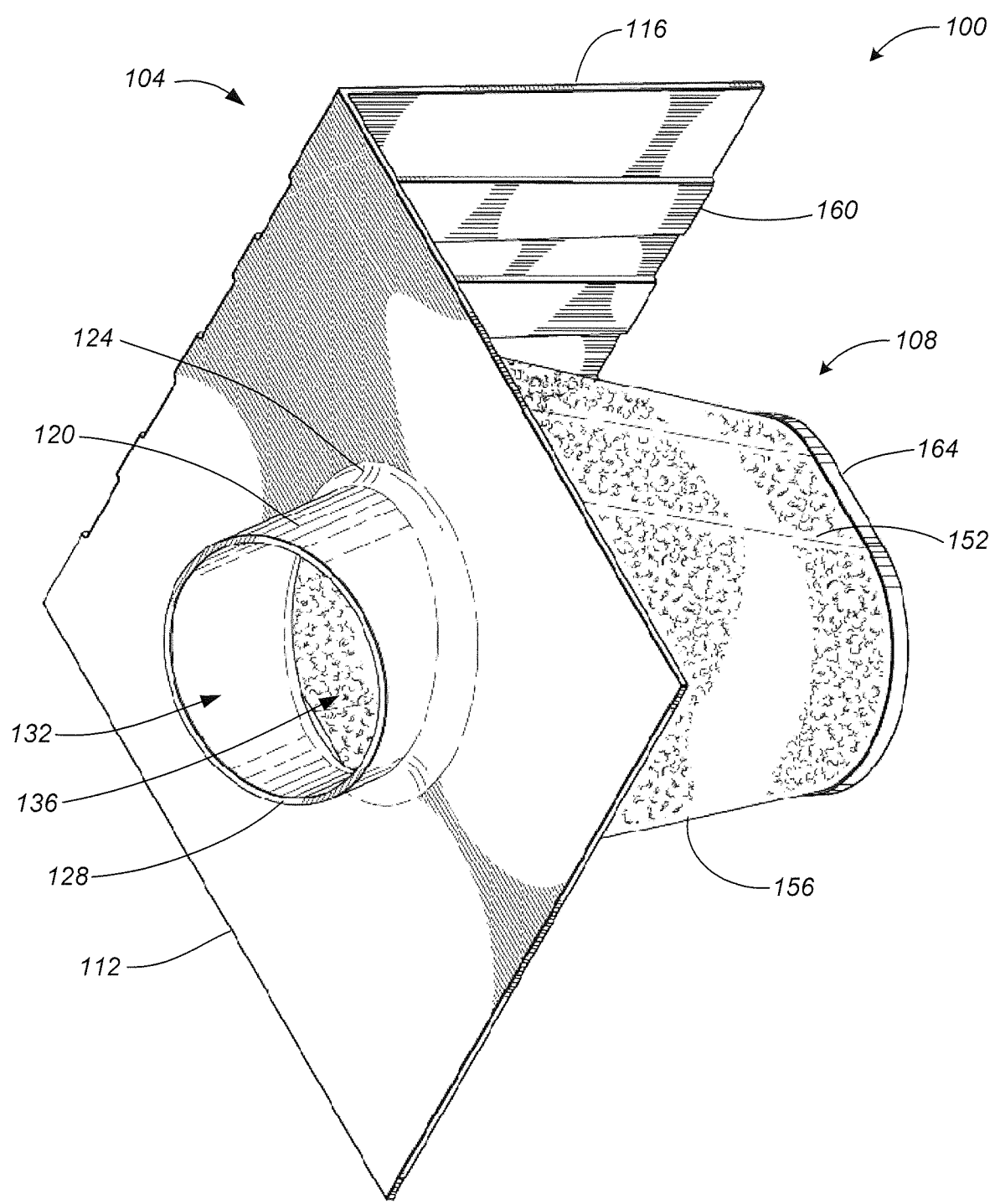
FIG. 1 is an upper perspective view of an exemplary embodiment of an air box with an integrated filter medium.

While the present invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present invention.

DETAILED DISCUSSION

In the following description, numerous specific details are set forth in order to provide a thorough understanding of the present invention. It will be apparent, however, to one of ordinary skill in the art that the present invention may be practiced without these specific details. In other instances, well known components or methods have not been described in detail but rather in a block diagram, or a schematic, in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention. The term "coupled" is defined as meaning connected either directly to the component or indirectly to the component through another component.

In general, the present invention describes an apparatus and a method for an air box with an integrated air filter to communicate air flow from an exterior of the air filter to an intake portion of an automobile engine. The air filter comprises a filter material circumferentially extending such that the filter material surrounds at least a portion of an interior cavity of the air filter. An end cap is affixed to a distal end of the filter material, and a wire support extends along at least a portion of the exterior surface of the filter material. The distal end cap and the wire support are configured to retain the filter material in a desired configuration and support the air filter. The air box comprises a housing portion and a mount portion. A front surface of the housing portion includes a conduit configured to receive an air intake conduit extending from the intake portion of the automobile engine. A back surface of the housing portion includes a ridge and a recess configured to receive a proximal end of the filter material. The housing portion is configured to direct air drawn through the filter material into the interior cavity of the air filter and then through the conduit into the intake portion of the automobile engine. The mount portion is configured to support the air box and the air filter, once installed, within an interior of an automobile engine bay.

FIGS. 1-4 illustrate an exemplary embodiment 100 of an air box 104 with an integrated air filter 108. With reference to FIG. 1, the air box 104 comprises a housing portion 112 and a mount portion 116. The air box 104 preferably is comprised of a material which is sufficiently durable and temperature resistant to retain its configuration during installation and operation when coupled with the air intake system of an automobile. The air box 104 generally is of an open variety, rather than being an enclosed air box as is conventionally utilized on many automobiles. It will be recognized by those skilled in the art that the open air box 104 improves airflow to the air filter 108, and thus decreases air resistance to the intake portion of the automobile engine, thereby improving engine performance beyond that otherwise possible with an enclosed air box. The mount portion 116 generally is configured to be mounted, or fastened, to the interior of an automobile engine bay. It is envisioned that the mount portion 116 is to include a suitable fastening means to facilitate installing the air box into the engine bay, such as, by way of example, suitably designed holes, brackets, molded shaped portions, protrusions, extensions, straps, hardware fasteners, or other any similar device for holding the air box fixed within the engine bay. It will be recognized that the particular fastening means will vary according to the specific make and model of the automobile with which the air box is to be used.

Figure 3:
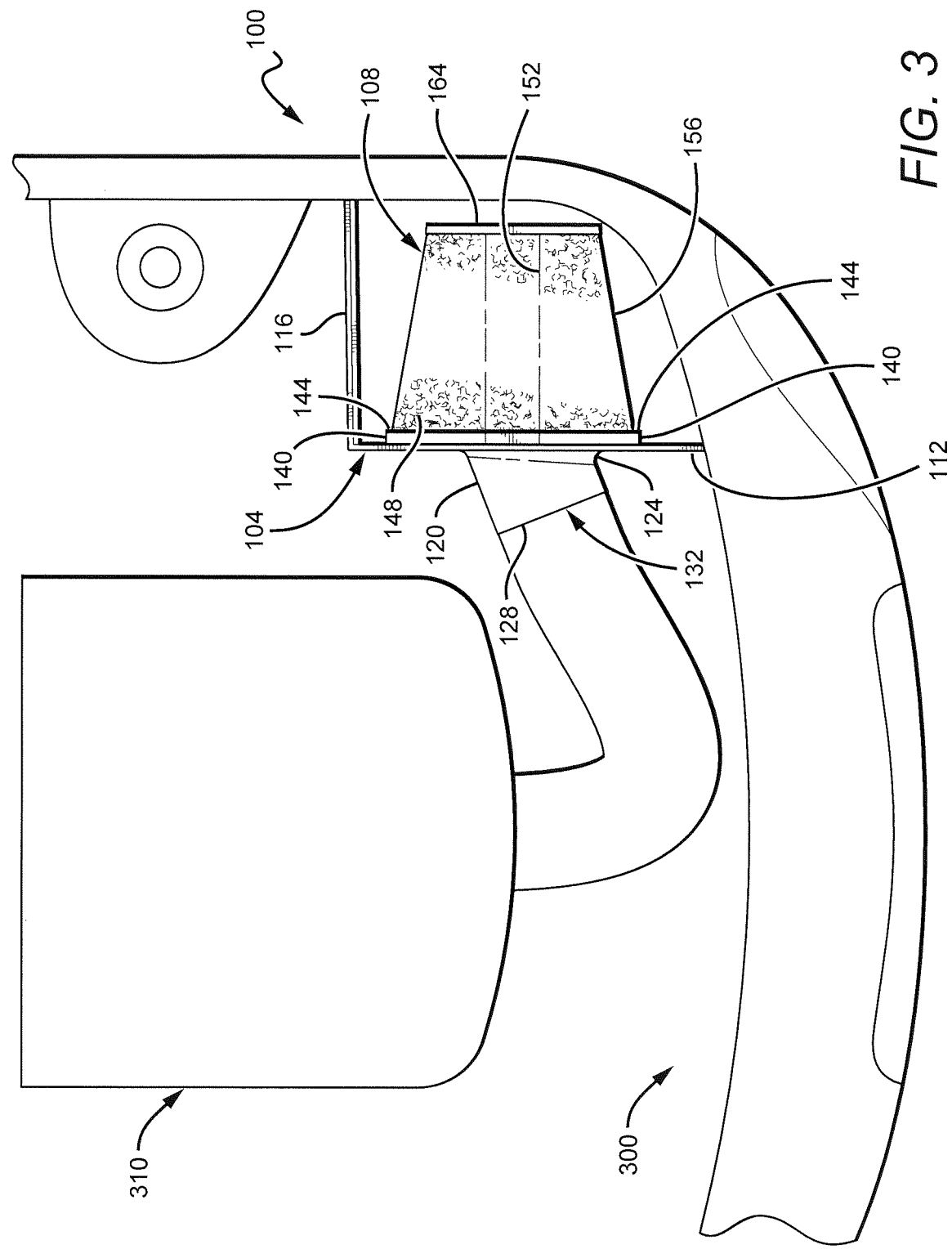
FIG. 3 is a top plan view of an exemplary embodiment of an air box with an integrated filter medium.
Figure 4:
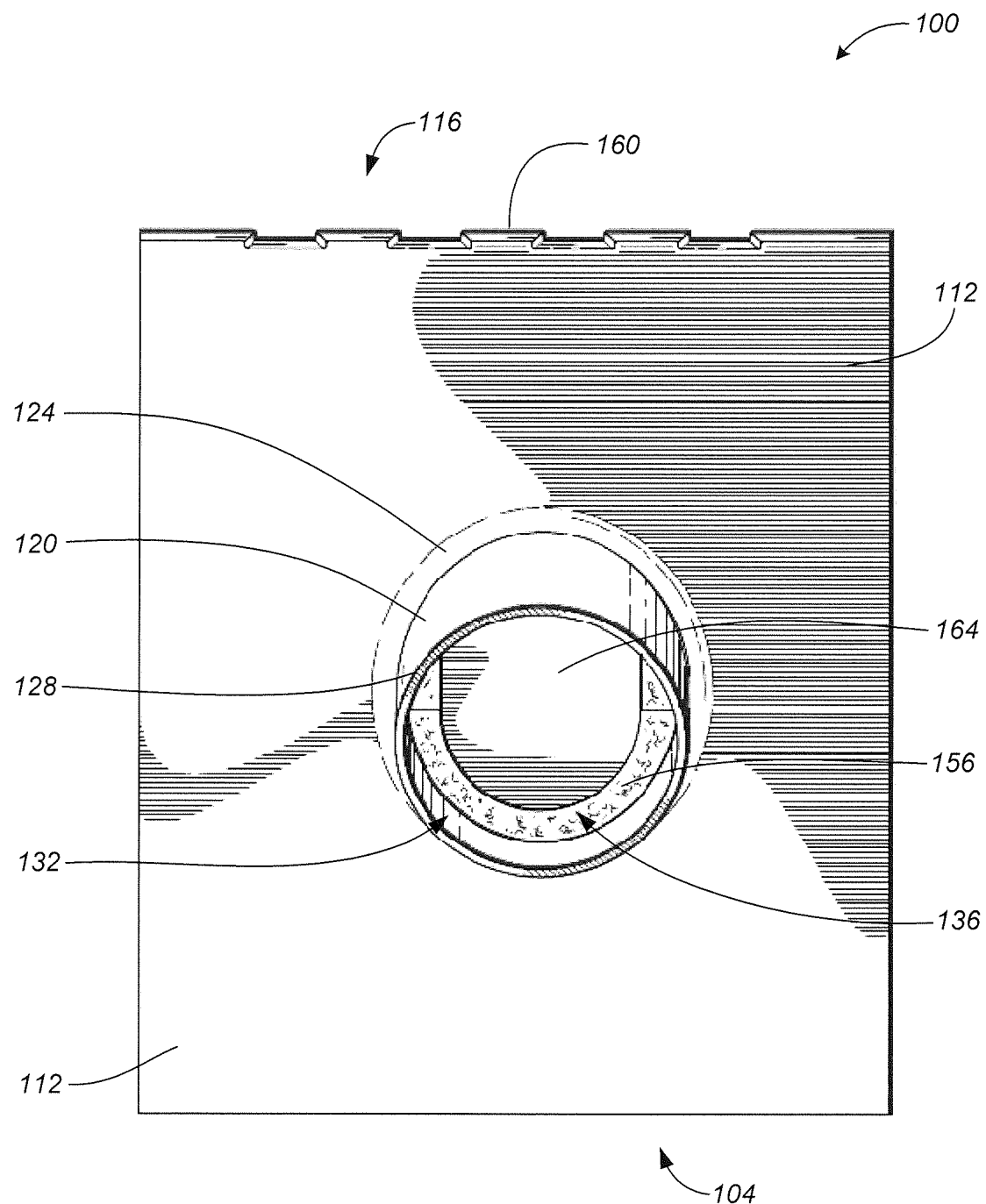
FIG. 4 is a front plan view of an exemplary embodiment of an air box with an integrated filter medium.

The housing portion 112 generally is configured to support the air filter 108 and provide an interface between the air filter 108 and an intake portion of an automobile engine. A front side of the housing portion 112 comprises a conduit 120 and a transition 124 that are configured to receive an air intake conduit extending to the intake portion of the automobile engine. Preferably, the transition 124 provides a molded connection between the conduit 120 and the housing portion 112, although other forms of connections will be apparent to those skilled in the art. As best shown in FIGS. 3-4, the transition 124 generally positions a longitudinal dimension of the conduit 120 at an angle relative to the housing portion 112. In one embodiment, the angle between the conduit 120 and the housing portion 112 is 90-degrees. In other embodiments, the value of the angle between the conduit 120 and the housing portion 112 depends upon the particular automobile for which the air box 104 is to be utilized. It will be appreciated that a wide variety of different angles of the conduit 120 may be incorporated into other embodiments of the air box 104 without detracting from the present invention.

The conduit 120 comprises a flange 128 and an opening 132. The opening 132 serves the function of conducting air drawn through the air filter 108 into an interior cavity 136 of the filter into the air intake of the automobile engine. It will be appreciated that the flange 128 has a configuration and the opening 132 has a diameter suitable to accept the air intake conduit of the automobile engine. For example, the flange 128 may comprise any of a variety of additional ridges, or raised portions, so as to optimally engage the air intake conduit of the automobile engine. The specific configuration of the flange 128 and the diameter of the opening 132 depend upon the particular make and model of the engine for which the air box 104 is to be utilized, and thus a wide variety of configurations and diameters may be incorporated into the air box 104 without straying beyond the scope of the present invention.

Figure 2:
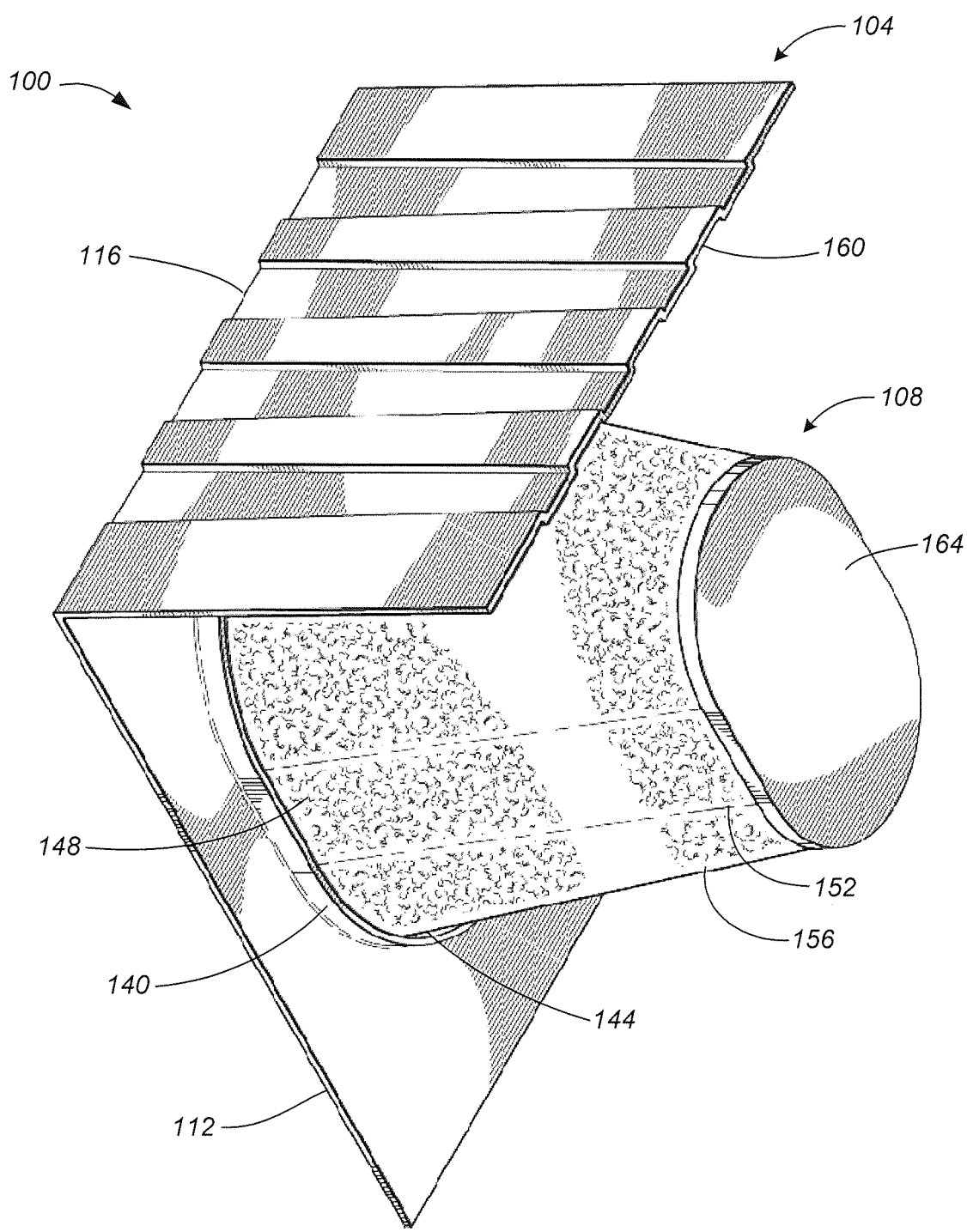
FIG. 2 is a lower perspective view of an exemplary embodiment of an air box with an integrated filter medium.

As best shown in FIGS. 2-3, a back side of the housing portion 112 comprises a ridge 140 and a recess 144 configured to receive a proximal end 148 of the air filter 108. It is envisioned that any of a variety of fasteners (not shown) may be used to affix the proximal end 148 within the recess 144. In an embodiment, the ridge 144 may be molded to a wire support 152 of the air filter 108. In another embodiment, the ridge 144 may be crimped such that it folds onto and retains the wire support 152 and a filter material 156 of the air filter 108. It will be appreciated that by those skilled in the art that fastening the air filter 108 to the housing portion 112 by way of the ridge 140 and the recess 144 renders the air filter 108 irremovable from the air box 104.

It is envisioned that a user of the air box 104 may periodically clean the air filter 108 rather than replacing the air filter, as is typically done with conventional air filter systems. One embodiment of a method for cleaning the air filter 108 comprises removing the air intake conduit of the automobile from the conduit 120, inserting a water hose through the opening 132 into the interior cavity 136 of the filter, and spraying water so as to flush contaminants from the filter material 156. It is envisioned that the water and filter contaminants drain from a bottom portion of the air filter 108 and exit the engine bay. In another embodiment of the method for cleaning the air filter 108, a high pressure air hose may be utilized in lieu of the water hose. In still another embodiment of the method for cleaning the air filter 108, water may be sprayed onto the top of the filter, as shown in FIG. 3, such that the water and contaminants drain from the bottom portion of the filter and exit the engine bay. Other cleaning methods will be apparent to those skilled in the art without deviating from the spirit and scope of the present invention.

As best shown in FIGS. 1-2, the mount portion 116 comprises a plurality of structural supports 160. In the illustrated embodiment of FIGS. 1-2, the structural supports 160 are ribs that increase the rigidity of the mount portion 116, as well as the connection between the mount portion 116 and the housing portion 112, thereby endowing the air box 104 with a resistance to warping when fastened within the engine bay. It will be appreciated by those skilled in the art that the structural supports 160 operate to keep the air filter 108 advantageously positioned within the engine bay without requiring an enclosed air box. Moreover, in the illustrated embodiment of FIG. 4, the housing portion 112 comprises a generally flat surface. In another embodiment, however, the housing portion 112 may comprise a plurality of structural members that are substantially similar to the structural members 160. In still other embodiments, the housing portion 112 may comprise a plurality of structural members that are different than the structural members 160. Various embodiments of the structural supports 160 other than the ribs shown in FIGS. 1-2 will be apparent to those skilled in the art.

With reference to FIG. 3, the air filter 104 comprises the wire support 152, the filter material 156, the proximal end 148, and a distal end cap 164. As discussed above, the proximal end 148 is fastened to the housing portion 112 by way of the ridge 140 and the recess 144. The distal end cap 164 may be similarly affixed to the air filter 108 by way of any of a variety of fasteners (not shown). In an embodiment, the distal end cap 164 may be molded to the wire support 152 of the air filter 108. In another embodiment, the distal end cap 164 may be crimped around its peripheral edge such that it folds onto and retains the wire support 152 and the filter material 156 of the air filter 108. In still another embodiment, a simple nut and bolt may be used to attach the filter material 156, the wire support 152, and distal end cap 164 onto the housing portion 112 such that the proximal end 148 is held fixed in the recess 144. Any of a variety of fastening means may be practiced for attaching the filter material 156, the wire support 152, and distal end cap 164 onto the housing portion 112, such that the air filter 108 is integrated into the air box 104 without deviating from the spirit and scope of the present invention. Further, the distal end cap 164 preferably is comprised of a material which is sufficiently hard so as to retain the filter material 152 in the desired configuration and support the air filter 108 when coupled to the housing portion 112. The material is also preferably durable enough to withstand repeated cleaning and use.

It will be appreciated that the wire support 152 provides additional strength and durability to the air filter 108, thereby facilitating periodic cleaning and reusing the air filter 108 instead of discarding the filter after each application. In one embodiment, the filter material 156 may be positioned between the wire support 152 and one or more layers of a reinforcing material. For example, the wire support 152 may comprise a wire screen positioned on an outer surface and an inner surface of the filter material 156. The wire screen may be a powder-coated aluminum screen wire that is co-pleated along with the filter medium 156 so as to reinforce the air filter 108. In other embodiments, additional or alternative reinforcements may be provided, as will be apparent to those skilled in the art.

In the illustrated embodiment of FIG. 3, the proximal end 148 has a larger size than the size of the distal end cap 164. It should be understood that embodiments of the present invention are not limited to the exact shape illustrated in FIGS. 1-4, but rather, include a wide variety of generally cylindrical shapes, generally circular, oval, round, curved, or other closed perimeter shapes, that provide a relatively large surface area of the filter material 156.

As shown in FIG. 1, the filter material 156 circumferentially surrounds the interior cavity 136 such that the filter material 156 creates an exterior perimeter of at least a portion of the interior cavity 136. As mentioned above, the exterior shape may be generally circular, oval, conical, or otherwise shaped to improve the surface area available for air flow passage for a given volume of the interior cavity 136. The shape may be consistent along a longitudinal length or may vary along the length. For example, the outer profile may taper from the proximal end 148 to the distal end cap 164, as shown in FIG. 3.

As will be appreciated by those skilled in the art, the filter material 156 provides a surface area through which to pass an air stream and trap particulate matter and other contaminates so as to prevent them from entering into the air intake of the automobile engine. The filter material 156 may be comprised of paper, foam, cotton, spun fiberglass, or other known filter materials, woven or non-woven material, synthetic or natural, or any combination thereof. The filter material 156 may be pleated or otherwise shaped or contoured to increase the surface area for passing the air stream to be cleaned. In other embodiments, the filter material 156 may comprise a combination of materials to create a hybrid filter medium. In still other embodiments, the filter material 156 may further comprise oil to enhance the air cleaning properties of the filter material. Other embodiments may include a depth loading feature which gives the air filter 108 a high airflow with a low restriction while providing large contaminant holding capacities.

While some specific embodiments of the present invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The present invention is to be understood as not limited by the specific embodiments described herein, but only by scope of the appended claims.

The invention claimed is:

1. A method for cleaning an air box with an integrated air filter that is installed within an engine bay of a vehicle, the method comprising:
    removing an air intake conduit of an internal combustion engine from a conduit of the air box, the conduit including a flange and an opening into an interior cavity of the air filter, and the interior cavity being bounded by a circumferentially extending filter material and a distal end cap;
    inserting a water hose through the opening into the interior cavity;
    spraying water so as to flush contaminants from the filter material; and
    allowing the water and contaminants to drain from a bottom of the air filter and exit the engine bay.

2. A method for cleaning an air box with an integrated air filter that is coupled with an internal combustion engine, the method comprising:
    removing a flange comprising the air box from an air intake conduit of the internal combustion engine, the flange including an opening into an interior cavity of the integrated air filter, and the interior cavity being bounded by a circumferentially disposed filter material and a distal end cap;
    inserting a water hose through the opening into the interior cavity;
    spraying water onto an interior surface of the filter material; and
    allowing the water and contaminants to drain from the integrated air filter and exit the air box.

3. The method of claim 2, wherein spraying water includes flushing the contaminants from the filter material.

4. The method of claim 2, wherein allowing further comprises allowing the water and contaminants to drain from a bottom portion of the air filter and exit an engine bay wherein the air box is installed.

\* \* \* \* \*